United States Patent
Jeong et al.

(10) Patent No.: US 12,529,835 B2
(45) Date of Patent: Jan. 20, 2026

(54) POLARIZING PLATE AND OPTICAL DISPLAY DEVICE COMPRISING SAME

(71) Applicant: SAMSUNG SDI CO., LTD., Yongin-si (KR)

(72) Inventors: Woo Jin Jeong, Suwon-si (KR); Seung Jun Lee, Suwon-si (KR); Il Jin Kim, Suwon-si (KR)

(73) Assignee: Wuxi Hengxin Optoelectronic Materials Co., Ltd., Wuxi (CN)

( * ) Notice: Subject to any disclaimer, the term of this patent is extended or adjusted under 35 U.S.C. 154(b) by 864 days.

(21) Appl. No.: 17/757,816

(22) PCT Filed: Dec. 10, 2020

(86) PCT No.: PCT/KR2020/018065
§ 371 (c)(1),
(2) Date: Jun. 21, 2022

(87) PCT Pub. No.: WO2021/132965
PCT Pub. Date: Jul. 1, 2021

(65) Prior Publication Data
US 2023/0055877 A1    Feb. 23, 2023

(30) Foreign Application Priority Data
Dec. 24, 2019    (KR) .................. 10-2019-0174560

(51) Int. Cl.
*G02B 5/30*      (2006.01)
*C08G 18/62*     (2006.01)
(Continued)

(52) U.S. Cl.
CPC .............. *G02B 5/30* (2013.01); *C08G 18/62* (2013.01); *C08G 18/6225* (2013.01);
(Continued)

(58) Field of Classification Search
None
See application file for complete search history.

(56) References Cited

U.S. PATENT DOCUMENTS

| 2007/0178325 A1* | 8/2007 | Edgecombe | ........ C08F 297/026 427/407.1 |
| 2013/0165597 A1* | 6/2013 | Kim | .................. C08G 18/6229 525/342 |
| 2013/0345333 A1 | 12/2013 | Kim et al. | |
| 2016/0152876 A1 | 6/2016 | Kim et al. | |

FOREIGN PATENT DOCUMENTS

| CN | 103509475 A | 1/2014 |
| CN | 105647438 A | 6/2016 |

(Continued)

OTHER PUBLICATIONS

Chinese Office Action dated Jan. 26, 2024, issued in corresponding Chinese Patent Application No. 202080089349.0 (6 pages).

(Continued)

*Primary Examiner* — Eli D. Strah
(74) *Attorney, Agent, or Firm* — Ricky Lam (57) ABSTRACT

Provided are a polarizing plate and an optical display device comprising same, wherein: the polarizing plate comprises a polarizer, a protection film formed on the surface of the polarizer, and a barrier layer formed on the other surface of the polarizer; the barrier layer is formed of a composition comprising a (meth)acryl-based copolymer, a curing agent, and a silane coupler; and the curing agent comprises a mixture of: a polyisocyanate curing agent containing a plurality of units, each containing an entirety of an alkylene group of two or more carbon atoms having a urethane bonding; and a polyisocyanate curing agent containing an isocyanurate group.

18 Claims, 1 Drawing Sheet

| Evaluation Result | Degree of separation | Aspect of separation |
|---|---|---|
| 5B | 0% | |
| 4B | Greater than 0% to less than 5% | |
| 3B | 5% to less than 15% | to |
| 2B | 15% to less than 35% | to |
| 1B | 35% to less than 65% | to |
| 0B | 65% or more | |

(51) Int. Cl.
  *C08G 18/79* (2006.01)
  *C08K 5/5435* (2006.01)
  *C08K 5/544* (2006.01)
  *C09D 175/04* (2006.01)
  *G02B 7/00* (2021.01)

(52) U.S. Cl.
  CPC ........... *C08G 18/79* (2013.01); *C08G 18/791* (2013.01); *C08K 5/5435* (2013.01); *C08K 5/544* (2013.01); *C08K 5/5477* (2021.01); *C09D 175/04* (2013.01); *G02B 7/008* (2013.01); *C09K 2323/031* (2020.08); *G02B 5/3033* (2013.01)

(56) References Cited

FOREIGN PATENT DOCUMENTS

| | | | |
|---|---|---|---|
| JP | 2013-072951 A | 4/2013 | |
| KR | 10-2016-0117870 A | 10/2016 | |
| KR | 10-2017-0086961 A | 7/2017 | |
| KR | 10-2018-0048363 A | 5/2018 | |
| KR | 10-2018-0059202 A | 6/2018 | |
| KR | 10-2018-0097970 A | 9/2018 | |
| WO | WO-2016159645 A1 * | 10/2016 | ............... B32B 7/12 |

OTHER PUBLICATIONS

International Search Report of PCT/KR2020/018065, Apr. 5, 2021, 4 pages.

\* cited by examiner

| Evaluation Result | Degree of separation | Aspect of separation |
|---|---|---|
| 5B | 0% | |
| 4B | Greater than 0% to less than 5% | |
| 3B | 5% to less than 15% | to |
| 2B | 15% to less than 35% | to |
| 1B | 35% to less than 65% | to |
| 0B | 65% or more | |

POLARIZING PLATE AND OPTICAL DISPLAY DEVICE COMPRISING SAME

CROSS-REFERENCE TO RELATED APPLICATIONS

This application is a U.S. National Phase Patent Application of International Application Number PCT/KR2020/018065, filed on Dec. 10, 2020, which claims priority to Korean Patent Application Number 10-2019-0174560, filed on Dec. 24, 2019, the entire content of each of which is incorporated herein by reference.

TECHNICAL FIELD

The present invention relates to a polarizing plate and an optical display device including the same.

BACKGROUND ART

In recent years, as an attempt to reduce the thickness of a polarizing plate continues, a polarizing plate having a protective film formed only on a light exit surface of a polarizer has been developed. However, such a polarizing plate is more vulnerable to external moisture than a polarizing plate having protective films on both surfaces of the polarizer. Accordingly, it is suggested to form a barrier layer on the other side of the polarizer instead of the protective film.

The barrier layer is generally formed of a UV curable composition in consideration of ease of manufacture and a conventional composition for adhesive layers. However, when the barrier layer is formed of the UV curable composition, an adhesive layer is additionally formed on the polarizing plate to attach the polarizing plate to a panel, thereby causing complication of a polarizing plate manufacturing process. Moreover, a typical barrier layer serves to reduce variation in light transmittance and/or polarization or to suppress generation of cracks when the polarizing plate is left under high temperature/humidity conditions and thus has a limitation in improvement of dye decolorizing of the polarizer.

The background technique of the present invention is disclosed in Japanese Unexamined Patent Publication No. 10-2013-072951 and the like.

DISCLOSURE

Technical Problem

It is one aspect of the present invention to provide a polarizing plate that includes a barrier layer formed through heat curing and exhibiting a good blocking effect with respect to external moisture.

It is another aspect of the present invention to provide a polarizing plate that can minimize decolorizing of a polarizer when left under high temperature/humidity conditions.

It is a further aspect of the present invention to provide a polarizing plate that includes a barrier layer exhibiting good adhesion with respect to a polarizer.

Technical Solution

An aspect of the present invention relates to a polarizing plate.

1. The polarizing plate includes a polarizer, a protective film formed on one surface of the polarizer and a barrier layer formed on the other surface of the polarizer, wherein the barrier layer is formed of a composition including a (meth)acrylic copolymer, a curing agent and a silane coupling agent, the curing agent including a mixture of a polyisocyanate curing agent having a plurality of units, each containing an alkylene group having a urethane bond and at least two carbon atoms, and an isocyanurate group-containing polyisocyanate curing agent.

2. In 1, the isocyanurate group-containing polyisocyanate curing agent may include an isocyanurate of an aromatic isocyanate compound.

3. In 1 and 2, the aromatic isocyanate compound may include at least one selected from among toluene diisocyanate, xylylene diisocyanate, halogenated toluene diisocyanate, phenylene diisocyanate, and tetramethyl-xylylene diisocyanate.

4. In 1 to 3, a weight ratio of the polyisocyanate curing agent having a plurality of units each containing an alkylene group having a urethane bond and at least two carbon atoms to the isocyanurate group-containing polyisocyanate curing agent may be in the range of 10:1 to 30:1.

5. In 1 to 4, the polyisocyanate curing agent having a plurality of units each containing an alkylene group having a urethane bond and at least two carbon atoms may include a polyisocyanate curing agent having a plurality of units represented by Formula 1.

$$*-R^1-O-(C=O)-NH-R^2-NCO \quad \text{[Formula 1]}$$

where * is a linking site; and
$R^1$ and $R^2$ are the same or different from each other and a bivalent $C_2$ to $C_{20}$ aliphatic hydrocarbon group.

6. In 1 to 5, $R_2$ in Formula 1 may be a $C_6$ alkylene group.

7. In 1 to 6, the silane coupling agent may include an epoxy group-containing silane coupling agent.

8. In 1 to 7, the composition may include: 100 parts by weight of the (meth)acrylic copolymer; 10 parts by weight to 30 parts by weight of the polyisocyanate curing agent having a plurality of units each containing an alkylene group having a urethane bond and at least two carbon atoms; 0.1 parts by weight to 5 parts by weight of the isocyanurate group-containing polyisocyanate curing agent; and 0.1 parts by weight to 10 parts by weight of the silane coupling agent.

9. In 1 to 8, the silane coupling agent may further include an isocyanurate group-containing silane coupling agent.

10. In 1 to 9, a weight ratio of the epoxy group-containing silane coupling agent to the isocyanurate group-containing silane coupling agent may be in the range of 1:0.1 to 1:10.

11. In 1 to 10, the isocyanurate group-containing silane coupling agent may include a compound represented by Formula 3.

[Formula 3]

where $R^1$, $R^2$ and $R^3$ are each independently a bivalent organic group, and
$R^4$, $R^5$ and $R^6$ are each independently an alkoxysilane group.

12. In 1 to 11, the isocyanurate group-containing silane coupling agent may be present in an amount of 0.1 parts by weight to 5 parts by weight relative to 100 parts by weight of the (meth)acrylic copolymer.

13. In 1 to 12, the (meth)acrylic copolymer may include a copolymer of a monomer mixture including 50 wt % to 80 wt % of a (meth)acrylic monomer having a glass transition temperature of 70° C. or more in a homopolymer phase.

14. In 1 to 13, the (meth)acrylic monomer having a glass transition temperature of 70° C. or more in a homopolymer phase may include at least one selected from among methyl methacrylate and isobornyl acrylate.

15. In 1 to 14, the monomer mixture may further include a hydroxyl group-containing (meth)acrylic monomer.

16. In 1 to 15, the barrier layer may have a modulus of 100 MPa or more at 25° C.

17. In 1 to 16, the polarizing plate may have a maximum decolorized length of 1,000 m or less, as measured on the polarizer after the polarizing plate is left at 85° C. or 60° C. and at 95% relative humidity (RH) for 250 hours.

Another aspect of the present invention relates to an optical display device.

The optical display device includes the polarizing plate according to the present invention.

Advantageous Effects

The present invention provides a polarizing plate that includes a barrier layer formed through heat curing and exhibiting a good blocking effect with respect to external moisture.

The present invention provides a polarizing plate that can minimize decolorizing of a polarizer when left under high temperature/humidity conditions.

The present invention provides a polarizing plate that includes a barrier layer exhibiting good adhesion with respect to a polarizer.

BEST MODE

Hereinafter, exemplary embodiments of the present invention will be described in detail with reference to the accompanying drawings. It should be understood that the present invention may be embodied in different ways and is not limited to the following embodiments. The following embodiments are provided to allow thorough understanding of the present invention to those skilled in the art such that the present invention can be easily implemented by those skilled in the art.

Herein, "(meth)acryl" refers to acryl and/or methacryl.

As used herein to represent a specific numerical range, the expression "X to Y" means "greater than or equal to X and less than or equal to Y (X≤ and ≤Y)".

Herein, "modulus" with respect to a barrier layer refers to "tensile modulus", which means a value measured at 25° C. in accordance with ASTM D882.

Herein, "moisture permeability" with respect to a barrier layer or a protective film refers to a value measured by a weighing method using a moisture permeable cup.

Hereinafter, a polarizing plate according to one embodiment of the present invention will be described.

The polarizing plate includes a polarizer, a protective film formed on an upper surface of the polarizer, and a barrier layer formed on a lower surface of the polarizer. The polarizing plate does not include a protective film on the lower surface of the polarizer.

The barrier layer is directly formed on the polarizer. Herein, "directly formed on" means that an adhesive layer, a bonding layer or an adhesive/bonding layer is not interposed between the polarizer and the barrier layer.

The barrier layer provides a barrier effect with respect to the polarizer. Herein, "barrier effect" means that an effect of external moisture on the polarizer is minimized by suppressing permeation of the external moisture.

The barrier layer is formed by coating a barrier-layer composition on the polarizer, followed by heat curing. The barrier-layer composition is a thermosetting composition. Like a polarizing plate including a barrier layer formed of a UV curable composition, the polarizing plate including the barrier layer formed of the barrier-layer composition does not require an adhesive layer, thereby enabling reduction in thickness of the polarizing plate and simplification of a manufacturing process. The adhesive layer is an essential component for adhesively attaching the polarizing plate to a panel and the like. For the polarizing plate including the barrier layer formed of the UV curable composition, in which a UV absorbent is added to the polarizing plate to suppress damage to a light emitting device by external UV light, the UV curable composition can be insufficiently cured upon UV curing.

The barrier-layer composition includes a (meth)acrylic copolymer, a curing agent, and a silane coupling agent, in which the curing agent includes a mixture of a polyisocyanate curing agent having a plurality of units, each containing the entirety of an alkylene group having a urethane bond and at least two carbon atoms, and an isocyanurate group-containing polyisocyanate curing agent.

The (meth)acrylic copolymer serves to form a matrix of the barrier layer and may have a glass transition temperature of 30° C. or more. Within this range, the (meth)acrylic copolymer can improve the barrier effect by increasing the modulus of the barrier layer. Specifically, the (meth)acrylic copolymer may have a glass transition temperature of 30° C. to 70° C.

The (meth)acrylic copolymer may have a weight average molecular weight of 200,000 to 500,000. Within this range, the (meth)acrylic copolymer can improve the barrier effect by increasing modulus of the barrier layer.

The (meth)acrylic copolymer may include a copolymer of a monomer mixture including 50 wt % or more of a (meth)acrylic monomer having a glass transition temperature of 70° C. or more in a homopolymer phase. As a result, the (meth)acrylic copolymer can easily reach the glass transition temperature. Although a layer formed of a composition including less than 50 wt % of the (meth)acrylic monomer having a glass transition temperature of 70° C. or more in a homopolymer phase can exhibit adhesion to a polarizer as in a typical adhesive layer, the layer does not have the barrier effect and an effect of suppressing decolorizing of the polarizer under high temperature/humidity conditions. Preferably, the (meth)acrylic monomer having a glass transition temperature of 70° C. or more in a homopolymer phase is present in an amount of 50 wt % to 80 wt % in the monomer mixture. For example, the (meth)acrylic monomer having a glass transition temperature of 70° C. or more in a homopolymer phase may be present in an amount of 50 wt %, 51 wt %, 52 wt %, 53 wt %, 54 wt %, 55 wt %, 56 wt %, 57 wt %, 58 wt %, 59 wt %, 60 wt %, 61 wt %, 62 wt %, 63 wt %, 64 wt %, 65 wt %, 66 wt %, 67 wt %, 68 wt %, 69 wt %, 70 wt %, 71 wt %, 72 wt %, 73 wt %, 74 wt %, 75 wt %, 76 wt %, 77 wt %, 78 wt %, 79 wt %, or 80 wt % in the monomer mixture.

In one embodiment, the (meth)acrylic copolymer may include 50 wt % to 80 wt % of the (meth)acrylic monomer having a glass transition temperature of 70° C. to 120° C. in a homopolymer phase. As a result, with the monomer mixture including suitable amounts of other monomers, the (meth)acrylic copolymer can improve adhesion to the polarizer. For example, the (meth)acrylic monomer having a glass transition temperature of 70° C. to 120° C. in a homopolymer phase may include an alkyl group-containing (meth)acrylic monomer.

The alkyl group-containing (meth)acrylic monomer having a glass transition temperature of 70° C. or more in a homopolymer phase may include methyl methacrylate (MMA) and isobornyl acrylate (IBOA), without being limited thereto.

In one embodiment, the (meth)acrylic copolymer may include a copolymer of a monomer mixture including 50 wt % to 80 wt % of methyl methacrylate.

The monomer mixture may further include an alkyl group-containing (meth)acrylic monomer having a glass transition temperature of −60° C. to 0° C. in a homopolymer phase. As a result, the (meth)acrylic copolymer can improve adhesion with respect to the polarizer, as compared with a (meth)acrylic copolymer including the (meth)acrylic monomer having a glass transition temperature of 70° C. or more in a homopolymer phase alone.

The alkyl group-containing (meth)acrylic monomer having a glass transition temperature of −60° C. to 0° C. in a homopolymer phase may include at least one selected from among N-butyl (meth)acrylate, 2-ethylhexyl (meth)acrylate, N-dodecyl acrylate, N-hexyl acrylate, 2-methoxyethyl acrylate, and N-octyl methacrylate.

The alkyl group-containing (meth)acrylic monomer having a glass transition temperature of −60° C. to 0° C. in a homopolymer phase may be present in an amount of 10 wt % to 30 wt %, preferably 15 wt % to 25 wt %, in the monomer mixture. For example, the alkyl group-containing (meth)acrylic monomer having a glass transition temperature of −60° C. to 0° C. in a homopolymer phase may be present in an amount of 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, or 30 wt %, in the monomer mixture.

The (meth)acrylic copolymer may include a copolymer of a monomer mixture including a substituted or unsubstituted $C_1$ to $C_{20}$ alkyl group-containing (meth)acrylic monomer and a hydroxyl group-containing (meth)acrylic monomer.

The substituted or unsubstituted $C_1$ to $C_{20}$ alkyl group-containing (meth)acrylic monomer may include an unsubstituted $C_1$ to $C_{20}$ alkyl group-containing (meth)acrylic acid ester. For example, the unsubstituted $C_1$ to $C_{20}$ alkyl group-containing (meth)acrylic acid ester may include at least one selected from among methyl (meth)acrylate, ethyl (meth)acrylate, propyl (meth)acrylate, n-butyl(meth)acrylate, t-butyl(meth)acrylate, iso-butyl (meth)acrylate, pentyl (meth)acrylate, hexyl (meth)acrylate, 2-ethylhexyl (meth)acrylate, heptyl (meth)acrylate, octyl (meth)acrylate, iso-octyl (meth)acrylate, nonyl (meth)acrylate, decyl (meth)acrylate, and dodecyl(meth)acrylate, without being limited thereto.

The hydroxyl group-containing (meth)acrylic monomer may include at least one selected from among a hydroxyl group-containing $C_1$ to $C_{20}$ alkyl group-containing (meth)acrylic monomer, a hydroxyl group-containing $C_3$ to $C_{20}$ cycloalkyl group-containing (meth)acrylic monomer, and a hydroxyl group-containing $C_6$ to $C_{20}$ aromatic group-containing (meth)acrylic monomer. Specifically, the hydroxyl group-containing (meth)acrylic monomer is a hydroxyl group-containing $C_1$ to $C_{20}$ alkyl group-containing (meth)acrylic monomer and may include at least one selected from among 2-hydroxyethyl(meth)acrylate, 2-hydroxypropyl (meth)acrylate, 2-hydroxybutyl(meth)acrylate, 4-hydroxybutyl(meth)acrylate, and 6-hydroxyhexyl(meth)acrylate. These may be used alone or as a mixture thereof.

The (meth)acrylic copolymer may include 85 wt % to 95 wt % of the substituted or unsubstituted $C_1$ to $C_{20}$ alkyl group-containing (meth)acrylic monomer and 5 wt % to 15 wt % of the hydroxyl group-containing (meth)acrylic monomer. Within this range, the (meth)acrylic copolymer can secure adhesion with respect to the polarizer and can form the barrier layer.

The (meth)acrylic copolymer may be prepared through typical polymerization of the monomer mixture. A polymerization method may include a typical method well-known to those skilled in the art. For example, the (meth)acrylic copolymer may be prepared by adding an initiator to the monomer mixture, followed by typical polymerization, for example, suspension polymerization, emulsion polymerization, solution polymerization, and the like. Polymerization may be performed at 65° C. to 70° C. for 6 hours to 8 hours. The initiator may be a typical initiator including an azo-based polymerization initiator and/or peroxides, such as benzoyl peroxide and acetyl peroxide.

The curing agent includes a mixture of the polyisocyanate curing agent having a plurality of units each containing the entirety of an alkylene group having a urethane bond and at least two carbon atoms and an isocyanurate group-containing polyisocyanate curing agent. The barrier-layer composition according to the present invention includes all of these two types of polyisocyanate curing agents as the curing agent. If the composition does not include any one of the two types of polyisocyanate curing agents, the composition cannot obtain the effects of the present invention.

The polyisocyanate curing agent having a plurality of units each containing the entirety of an alkylene group having a urethane bond (—(C═O)—NH—) and at least two carbon atoms can secure tackiness between the polarizer and the barrier layer while improving adhesion of the barrier layer to the polarizer together with the degree of crosslinking in the barrier layer.

Herein, "alkylene group" refers to a linear or branched $C_2$ to $C_{20}$ alkylene group, for example, hexamethylene group, dodecamethylene group, or trimethylhexamethylene group, without being limited thereto. The polyisocyanate curing agent does not contain an isocyanurate group. Preferably, the alkylene group is a linear $C_2$ to $C_{20}$ alkylene group and acts as a flexible unit to suppress decolorizing of the polarizer through formation of a network upon crosslinking reaction.

In one embodiment, the polyisocyanate curing agent may include a polyisocyanate curing agent having a unit represented by Formula 1. Preferably, the curing agent includes a plurality of units represented by Formula 1.

*—R$^1$—O—(C═O)—NH—R$^2$—N═C═O [Formula 1]

where * is a linking site, and

R$^1$, R$^2$ are the same or different from each other and a bivalent $C_2$ to $C_{20}$ aliphatic hydrocarbon group.

The aliphatic hydrocarbon group may be a linear alkylene group, preferably a linear $C_6$ to $C_{20}$ alkylene group.

In one embodiment, the polyisocyanate curing agent may include an allophanate group-modified polyisocyanate curing agent.

The polyisocyanate curing agent may be present in an amount of 10 parts by weight to 30 parts by weight, for example, 20 parts by weight to 25 parts by weight, relative to 100 parts by weight of the (meth)acrylic copolymer. Within this range, the polyisocyanate curing agent can improve adhesion of the barrier layer with respect to the polarizer and the degree of crosslinking in the barrier layer. For example, the polyisocyanate curing agent may be present in an amount of 10, 11, 13, 14, 15, 16, 17, 18, 19, 20, 21, 22, 23, 24, 25, 26, 27, 28, 29, or 30 parts by weight relative to 100 parts by weight of the (meth)acrylic copolymer.

It is possible to improve the degree of crosslinking in the barrier layer using only the polyisocyanate curing agent having a plurality of units each containing the entirety of an alkylene group having a urethane bond and at least two carbon atoms. However, when the curing agent includes only the polyisocyanate curing agent having a plurality of units each containing the entirety of an alkylene group having a urethane bond and at least two carbon atoms or an excess of such a polyisocyanate curing agent, the barrier-layer composition cannot form a network upon heat curing of the barrier-layer composition and fails to suppress decolorizing of the polarizer when the polarizing plate is left under high temperature/humidity conditions.

The isocyanurate group-containing polyisocyanate curing agent forms a network after heat curing of the barrier-layer composition and provides an effect of suppressing decolorizing of the polarizer when the polarizing plate is left under high temperature/humidity conditions. A composition including an isocyanurate group-free polyisocyanate curing agent cannot form the barrier layer having the effects of the present invention.

In one embodiment, the polarizing plate may have a maximum decolorized length of 1,000 μm or less. Within this range, the polarizing plate can exhibit good reliability under high temperature/humidity conditions and can realize efficient polarization even after the polarizing plate is left under high temperature/humidity conditions. Here, "decolorized length" is measured on the polarizer using a microscope after the polarizing plate is left at 85° C. or 60° C. and at 95% RH for 250 hours. Details of the measurement method are described in an experimental example described below. Specifically, the polarizing plate may have a maximum decolorized length of 850 μm or less.

The isocyanurate group-containing polyisocyanate curing agent essentially includes an isocyanurate group represented by Formula 2.

[Formula 2]

where * is a linking site.

The isocyanurate group-containing polyisocyanate curing agent may include an isocyanurate of an aromatic isocyanate compound. An isocyanurate of an aliphatic isocyanate compound or an alicyclic isocyanate compound instead of the aromatic isocyanate compound cannot form the barrier layer having the effects of the present invention or provides an insignificant barrier effect.

The aromatic isocyanate compound may include a bi- to hexafunctional isocyanate compound. For example, the aromatic isocyanate compound may include at least one selected from among toluene diisocyanate (TDI), xylylene diisocyanate, halogenated toluene diisocyanate, phenylene diisocyanate including m-phenylene diisocyanate and the like, and tetramethyl-xylylene diisocyanate. Preferably, the aromatic isocyanate compound includes toluene diisocyanate.

The isocyanurate group-containing polyisocyanate curing agent may include a tri- to hexafunctional polyisocyanate curing agent. The polyisocyanate curing agent may include isocyanurate groups within this range of the number of functional groups to improve the degree of crosslinking in the barrier layer.

The isocyanurate group-containing polyisocyanate curing agent may be present in an amount of 0.1 parts by weight to 5 parts by weight, for example, 0.1 parts by weight to 2.5 parts by weight, relative to 100 parts by weight of the (meth)acrylic copolymer. Within this range, the barrier layer can achieve the barrier effect through reduction in moisture permeability and can suppress decolorizing of the polarizer under high temperature/humidity conditions. For example, the isocyanurate group-containing polyisocyanate curing agent may be present in an amount of 0.1, 0.2, 0.3, 0.4, 0.5, 0.6, 0.7, 0.8, 0.9, 1, 2, 3, 4 or 5 parts by weight relative to 100 parts by weight of the (meth)acrylic copolymer.

As such, the isocyanurate group-containing polyisocyanate curing agent is present in a smaller amount than the polyisocyanate curing agent having a plurality of units each containing the entirety of an alkylene group having a urethane bond and at least two carbon atoms to secure the barrier effect of the barrier layer according to the present invention while solving problems in the case where the composition includes an excess of the polyisocyanate curing agent having a plurality of units each containing the entirety of an alkylene group having a urethane bond and at least two carbon atoms alone.

A weight ratio of the polyisocyanate curing agent having a plurality of units each containing the entirety of an alkylene group having a urethane bond and at least two carbon atoms to the isocyanurate group-containing polyisocyanate curing agent may be in the range of 10:1 to 30:1. Within this range, the barrier-layer composition can secure the barrier effect of the barrier layer while improving adhesion of the barrier layer with respect to the polarizer. Preferably, the weight ratio is in the range of 15:1 to 25:1.

The silane coupling agent serves to improve adhesion of the barrier layer with respect to the polarizer and durability of the barrier layer.

The silane coupling agent may be present in an amount of 0.1 parts by weight to 10 parts by weight relative to 100 parts by weight of the (meth)acrylic copolymer. Within this range, the barrier-layer composition can improve adhesion. Preferably, silane coupling agent is present in an amount of 0.5 parts by weight to 5 parts by weight. For example, the silane coupling agent silane coupling agent may be present in an amount of 0.1, 0.2, 0.3, 0.4, 0.5, 0.6, 0.7, 0.8, 0.9, 1, 2, 3, 4, 5, 6, 7, 8, 9 or 10 parts by weight relative to 100 parts by weight of the (meth)acrylic copolymer.

The silane coupling agent may be an epoxy group-containing silane coupling agent, such as glycidoxypropyltrimethoxysilane, glycidoxypropylmethyldimethoxysilane, and the like. The epoxy group-containing silane coupling agent is effective in improvement in durability of the barrier-layer composition. In one embodiment, the silane coupling agent may be free from an isocyanurate group. The epoxy group-containing silane coupling agent may be present in an amount of 0.1 parts by weight to 5 parts by weight relative to 100 parts by weight of the (meth)acrylic copolymer. Within this range, the epoxy group-containing silane coupling agent is effective in improvement in adhesion of the barrier layer. Preferably, the epoxy group-containing silane coupling agent is present in an amount of 0.1 parts by weight to 3 parts by weight. For example, the epoxy group-containing silane coupling agent may be present in an amount of 0.1, 0.2, 0.3, 0.4, 0.5, 0.6, 0.7, 0.8, 0.9, 1, 2 or 3 parts by weight relative to 100 parts by weight of the (meth)acrylic copolymer.

The barrier-layer composition may further include typical additives and a catalyst for promoting heat curing of the barrier-layer composition in addition to the (meth)acrylic copolymer, curing agent, and silane coupling agent.

A barrier layer formed of the barrier-layer composition may have a modulus of 100 MPa or more at 25° C., for example, 200 MPa to 500 MPa, or 300 MPa to 500 MPa. Within this range, the barrier layer can secure the barrier effect.

The barrier layer formed of the barrier-layer composition may have a degree of moisture permeation of 500 $g/m^2 \cdot 24$ hr or less, for example, 10 $g/m^2 \cdot 24$ hr to 500 $g/m^2 \cdot 24$ hr. Within this range, the barrier layer can secure the barrier effect.

The barrier layer may be formed by coating the barrier-layer composition to a predetermined thickness on the polarizer, followed by heat curing at 40° C. to 120° C., for example, at 40° C. to 90° C. Accordingly, the barrier-layer composition is free from at least one of a photo cationic initiator and a photo radical initiator.

The barrier layer may have a thickness of 10 μm to 100 μm, preferably 10 μm to 50 μm. Within this range, the barrier layer can be used in the polarizing plate.

The polarizer is interposed between the protective film and the barrier layer to polarize light entering the polarizing plate.

The polarizer may have a thickness of 5 μm to 30 μm, preferably 5 μm to 20 μm. Within this range, the polarizer can be used in the polarizing plate and can realize reduction in thickness of the polarizing plate.

The polarizer may include a polarizer produced from a polyvinyl alcohol resin film. Specifically, the polarizer may be a polyvinyl alcohol-based polarizer in which at least one type of dichroic dyes including iodine and the like is adsorbed to a polyvinyl alcohol resin film. The polyvinyl alcohol resin film may have a degree of saponification of 85 mol % to 100 mol %, specifically 98 mol % to 100 mol %. The polyvinyl alcohol resin film may have a degree of polymerization of 1,000 to 10,000, specifically 1,500 to 10,000. With these ranges of the degree of saponification and the degree of polymerization, the polarizer can be manufactured. The polarizer may be manufactured by a typical method well-known to those skilled in the art.

The protective film is formed on one surface of the polarizer to protect the polarizer.

The protective film may include a protective film formed of an optically transparent resin. Specifically, the resin may include at least one selected from among cyclic polyolefin resins including an amorphous cyclic olefin polymer (COP) and the like, poly(meth)acrylate resins, polycarbonate resins, polyester resins including polyethylene terephthalate (PET) and the like, cellulose ester resins including triacetylcellulose (TAC) and the like, polyethersulfone resins, polysulfone resins, polyamide resins, polyimide resins, non-cyclic polyolefin resins, polyarylate resins, polyvinyl alcohol resins, polyvinyl chloride resins, polyvinylidene chloride resins, and the like. In one embodiment, the protective film may be a monolayer film formed of one type of polyester resin.

The protective film may have a thickness of 5 μm to 200 μm, specifically 10 μm to 150 μm, more specifically 20 μm to 100 μm. Within this range, the protective film can be used in the polarizing plate.

The protective film may have a degree of moisture permeation of 100 $g/m^2 \cdot 24$ hr to 800 $g/m^2 \cdot 24$ hr, specifically 300 $g/m^2 \cdot 24$ hr to 600 $g/m^2 \cdot 24$ hr. Within this range, the protective film can improve durability of the polarizing plate.

Functional coating layers may be further formed on an upper surface of the protective film, that is, on a surface of the protective film not contacting the polarizer to provide an addition function to the protective film and/or the polarizing plate. The functional coating layers may include a hard coating layer, an anti-reflective layer, an anti-fingerprint layer, an anti-glare layer, and the like, without being limited thereto.

The protective film may be bonded to the polarizer through a typical bonding agent for polarizing plates, for example, a water-based bonding agent or a photo-curable bonding agent. Specifically, the water-based bonding agent may be a mixture of water with polyvinyl alcohol, polyethylene imine, and a zirconium compound, such as zirconium oxide and the like. The photo-curable bonding agent may be a mixture of at least one of an epoxy resin and a (meth)acrylate resin.

Next, a polarizing plate according to another embodiment of the present invention will be described.

The polarizing plate includes a protective film, a polarizer and a barrier layer, which is formed of a composition including a (meth)acrylic copolymer, a curing agent and a silane coupling agent, wherein the curing agent includes a mixture of a polyisocyanate curing agent having a plurality of units, each including the entirety of an alkylene group having a urethane bond and at least two carbon atoms, and an isocyanurate group-containing polyisocyanate curing agent, and the silane coupling agent further includes an isocyanurate group-containing silane coupling agent.

The silane coupling agent is substantially the same as the silane coupling agent for the polarizing plate according to the above embodiment of the present invention, except that the silane coupling agent further includes an isocyanurate group-containing silane coupling agent in addition to the epoxy group-containing silane coupling agent. The following description will focus on the isocyanurate group-containing silane coupling agent.

The isocyanurate group-containing silane coupling agent can further improve the degree of crosslinking and durability of the barrier layer while further improving the effect of suppressing decolorizing of the polarizer under high temperature/humidity conditions.

The isocyanurate group-containing silane coupling agent contains an isocyanurate group represented by Formula 2 and may include an alkoxysilane group-containing silane coupling agent. In one embodiment, the isocyanurate group-containing silane coupling agent may include a compound represented by Formula 3.

[Formula 3]

where $R^1$, $R^2$ and $R^3$ are each independently a bivalent organic group; and $R^4$, $R^5$ and $R^6$ are each independently an alkoxysilane group.

In Formula 3, the bivalent organic group may be a $C_1$ to $C_5$ alkylene group. In Formula 3, the alkoxysilane group may include a $C_1$ to $C_3$ monoalkoxysilane, dialkoxysilane or trialkoxysilane.

The isocyanurate group-containing silane coupling agent may be present in an amount of 0.1 parts by weight to 5 parts by weight relative to 100 parts by weight of the (meth) acrylic copolymer. Within this range, the isocyanurate group-containing silane coupling agent can improve durability and the degree of crosslinking in the barrier layer. Preferably, isocyanurate group-containing silane coupling agent is present in an amount of 0.1 parts by weight to 2.5 parts by weight.

The weight ratio of an isocyanurate group-free silane coupling agent, that is, an epoxy group-containing silane coupling agent, to the isocyanurate group-containing silane coupling agent may be in the range of 1:0.1 to 1:10, preferably 1:0.1 to 1:5.

An optical display device according to one embodiment of the present invention may include the polarizing plate according to the embodiments of the present invention. The optical display device may include a liquid crystal display, an organic light emitting diode display, and a flexible organic light emitting diode display, without being limited thereto. The optical display device may include a visibility enhancing film including quantum dots in order to improve color reproduction rate and visibility.

MODE FOR INVENTION

Next, the present invention will be described in more detail with reference to some examples. However, it should be noted that these examples are provided for illustration only and are not to be construed in any way as limiting the present invention.

Details of components for examples and comparative examples are as follows.

(A1) Isocyanate-based curing agent: AE700-100 (Asahi Kasei Chemical Co., Ltd., polyisocyanate adduct having a plurality of *—$C_{15}H_{30}$—O—(C=O)—NH—$C_6H_{12}$—NCO units [* being a linking site], solid content: 100 wt %)

(A2) Isocyanate-based curing agent: Desmodur IL (isocyanurate group-containing TDI-based curing agent, trifunctional isocyanate-based curing agent)

(A3) Isocyanate-based curing agent: TDI-based curing agent (Coronate-L, Nippon Polyurethane Industry Co., Ltd., free from an isocyanurate group)

(B1) Silane coupling agent: KBM403 (3-glycidoxypropyltrimethoxysialne, Shin-Etsu Chemical Co., Ltd.)

(B2) Silane coupling agent: KBM 9659 (tris-(trimethoxysillylpropyl)isocyanurate, Shin-Etsu Chemical Co., Ltd.)

(C) Protective film: normal TAC film (Konica Co., Ltd., KC4DR-1, thickness: 40 m, Degree of moisture permeability: 400 g/m²·24 hr)

(D) Water-based bonding agent: A curing agent prepared by mixing 3.5 parts by weight of polyvinyl alcohol powder (Z-320, Nippon Synthetic IND), 1 part by weight of polyethylene imine (Nippon Shokubai Co., Ltd.), and 0.1 parts by weight of zirconium oxide (Nippon Kigenso Kagaku Kogyo Co., Ltd.) with 100 parts by weight of water.

Example 1

(1) Preparation of Composition for Barrier Layer

A (meth)acrylic copolymer comprising 65 wt % of methyl methacrylate (homopolymer Tg: 105° C.) and 25 wt % of N-butyl acrylate (homopolymer Tg: −54° C.) and 10 wt % of 2-hydroxyethyl acrylate was prepared through solution polymerization. The (meth)acrylic copolymer had a glass transition temperature of 40° C. and a weight average molecular weight of 300,000.

A barrier-layer composition was prepared by mixing 100 parts by weight of the prepared (meth)acrylic copolymer, 20 parts by weight of the curing agent (A1), 1.0 part by weight of the curing agent (A2), 2.5 parts by weight of the silane coupling agent (B1), and 0.5 parts by weight of the silane coupling agent (B2) in terms of solid content.

(2) Fabrication of Polarizing Plate

A polyvinyl alcohol film (Kuraray Co., Ltd., degree of saponification: 99.5 mol %, degree of polymerization: 2,000, thickness: 80 m) was dipped in a 0.3% iodine aqueous solution for dyeing. The dyed polyvinyl alcohol film was uniaxially stretched at an elongation ratio of 5.0. The stretched polyvinyl alcohol film was dipped in a 3% boric acid aqueous solution and a 2% potassium iodide aqueous solution for color correction. Then, the polyvinyl alcohol film was dried at 50° C. for 4 min, thereby preparing a polarizer (thickness: 12 m).

The protective film (C) was bonded to an upper surface of the polarizer using the water-based bonding agent (D). The prepared barrier-layer composition was coated to a predetermined thickness on a lower surface of the polarizer, dried at 25° C. for 2 minutes and cured through heat curing at 90° C. for 30 minutes, thereby preparing a polarizing plate in which a barrier layer (thickness: 20 m) is formed on the lower surface of the polarizer.

Examples 2 to 5

Polarizing plates were manufactured in the same manner as in Example 1 except that the content of each component of the barrier-layer composition was changed as listed in Table 1 (unit: parts by weight). In Table 1, "-" means that a corresponding component is not present.

Comparative Examples 1 to 5

Polarizing plates were manufactured in the same manner as in Example 1 except that the content of each component of the barrier-layer composition was changed as listed in Table 1 (unit: parts by weight).

Figure 1:
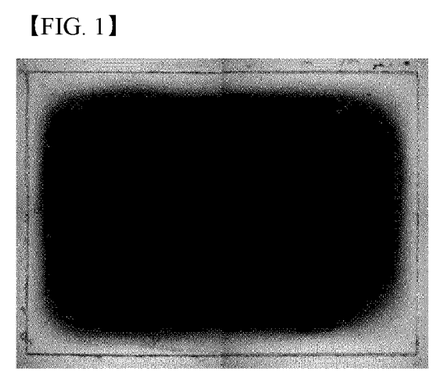
FIG. 1 is a picture showing a result of decolorizing evaluation of a polarizer of a polarizing plate of Example 1.
Figure 2:
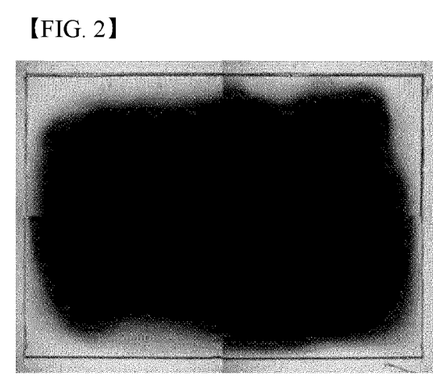
FIG. 2 is a picture showing a result of decolorizing evaluation of a polarizer of a polarizing plate of Comparative Example 1.

The polarizing plates prepared in Examples and Comparative Examples were evaluated as to properties of Table 1 and results are shown in Table 1, FIG. 1, and FIG. 2.

(1) Decolorized length (unit: m): Each of the polarizing plates prepared in Examples and Comparative Examples was cut to a size of 100 mm×175 mm (MD×TD of polarizer), laminated on a glass plate, and pressed under a pressure of 4 kg to 5 kg, thereby preparing a specimen. The specimen was left at 60° C. and 95% RH for 250 hours, followed by measurement of a decolorized length on the polarizer.

Figure 3:
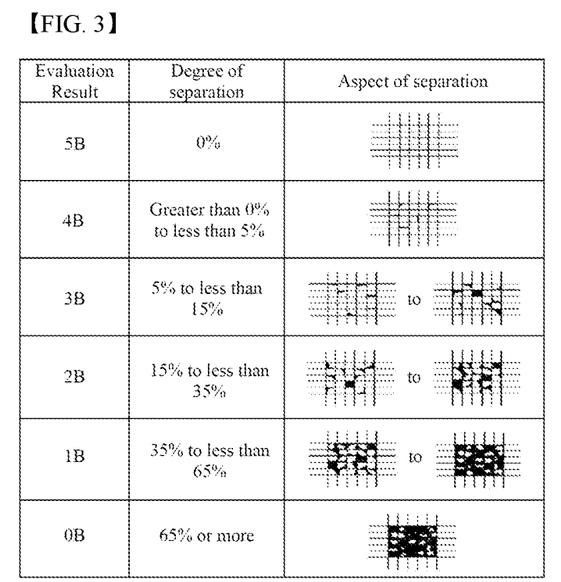
FIG. 3 is a table showing an adhesion evaluation standard of an experimental example.

(2) Adhesion (Cross-cut Tape Test): Each of the polarizing plates prepared in Examples and Comparative Examples was cut into a square-shaped specimen. Then, the barrier layer was cut to a predetermined depth using a knife so as to form 10 segments in the transverse direction and 10 segments in the longitudinal direction, thereby forming a total of 100 segments on the barrier layer. Then, an adhesive tape (3M) was attached to the barrier layer, followed by evaluation of adhesion based on the number of segments separated from the barrier layer upon separation of the adhesive tape from the barrier layer. Evaluation of adhesion was performed in accordance with a standard stated in FIG. 3.

(3) Modulus of barrier layer (unit: MPa): Tensile modulus was measured on the barrier layer by a stress-strain test method in accordance with ASTM D882. The barrier-layer composition was coated to a predetermined thickness on a release film and dried at 90° C. for 30 min, followed by separating the release film to obtain a 35 μm thick barrier layer. The barrier layer was cut into a specimen having a size of 5 mm×200 mm (width×length). With both ends of the specimen secured to jigs of a measurement instrument for tensile testing, tensile modulus was measured under the following conditions. Measurement conditions of tensile modulus were as follows.

<Measurement Condition of Tensile Modulus>

Measurement instrument: UTM (Universal Testing Machine)

Model: Texture analyzer, Stable Micro Systems Inc.

Measurement condition: Load cell: 300N, Tensile speed: 6 mm/sec

Measurement temperature: 25° C.

(4) Moisture permeability of barrier layer (Degree of moisture permeation) (unit: g/m²·24 hr): Degree of moisture permeation was measured on the barrier layer by a moisture permeable cup method. The barrier-layer composition was coated to a predetermined thickness on a release film and dried at 90° C. for 30 min, followed by separating the release film to obtain a 35 μm thick barrier layer. The barrier layer was cut into a specimen having a size of 5 mm×200 mm (width×length). The degree of moisture permeation was measured by the moisture permeable cup method.

external moisture, and could improve reliability by securing good adhesion of the barrier layer with respect to the polarizer. In addition, as shown in FIG. 1, the polarizing plates according to the present invention had a much lower degree of decolorizing on the polarizer than Comparative Example 1 shown in FIG. 2 and exhibited a similar degree of decolorizing at each corner of the polarizing plate, thereby improving processability.

Conversely, as shown in Table 1, the polarizing plates of Comparative Examples failed to secure all of the effects according to the present invention. In addition, as shown in FIG. 2, the polarizing plate of Comparative Example 1 exhibited severe decolorizing of the polarizer and had an uneven degree of decolorizing at each corner of the polarizing plate, thereby providing low processability.

It should be understood that various modifications, changes, alterations, and equivalent embodiments can be made by those skilled in the art without departing from the spirit and scope of the present invention.

The invention claimed is:

1. A polarizing plate comprising:
a polarizer;
a protective film formed on one surface of the polarizer; and
a barrier layer formed on the other surface of the polarizer, wherein the barrier layer is formed of a composition comprising
a (meth)acrylic copolymer,
a curing agent, and
a silane coupling agent,
the curing agent comprising a mixture of
a polyisocyanate curing agent comprising a plurality of units, each containing an alkylene group having a urethane bond and at least two carbon atoms, and
an isocyanurate group-containing polyisocyanate curing agent comprising an isocyanurate of an aromatic isocyanate compound, and
wherein the aromatic isocyanate compound is at least one selected from among toluene diisocyanate, xylylene diisocyanate, halogenated toluene diisocyanate, phenylene diisocyanate, or tetramethyl-xylylene diisocyanate.

TABLE 1

| | | Example | | | | | Comparative Example | | | | |
|---|---|---|---|---|---|---|---|---|---|---|---|
| | | 1 | 2 | 3 | 4 | 5 | 1 | 2 | 3 | 4 | 5 |
| Copolymer | | 100 | 100 | 100 | 100 | 100 | 100 | 100 | 100 | 100 | 100 |
| Curing | (A1) | 20 | 20 | 20 | 20 | 20 | 20 | 15 | 15 | — | 20 |
| agent | (A2) | 1.0 | 1.0 | 1.0 | 1.0 | 1.0 | — | — | — | 1.0 | — |
| | (A3) | — | — | — | — | — | — | — | — | — | 1.0 |
| Silane | (B1) | 2.5 | 0.1 | 0.5 | 2.5 | 2.5 | — | 2.5 | — | 2.5 | 2.5 |
| coupling agent | (B2) | 0.5 | 0.5 | 0.5 | 2.5 | — | — | — | 2.5 | 0.5 | 0.5 |
| Decolorized length | @60° C., 95% RH | 820 | 650 | 780 | 585 | 850 | 1590 | 2120 | 1955 | 1250 | 1187 |
| Adhesion | | 3B | 3B | 3B | 3B | 2B | 3B | 1B | 1B | 0B | 3B |
| Modulus | | 310 | 420 | 350 | 320 | 315 | 220 | 275 | 262 | 52 | 290 |
| Degree of permeation | | 495 | 520 | 455 | 470 | 450 | 615 | 600 | 552 | 1325 | 428 |

As shown in Table 1, the polarizing plates according to the present invention could minimize decolorizing of the polarizers when left under high temperature/humidity conditions, provided a good effect in suppression of permeation of 2. The polarizing plate according to claim 1, wherein the aromatic isocyanate compound is at least one selected from among toluene diisocyanate, halogenated toluene diisocyanate, or phenylene diisocyanate.

3. The polarizing plate according to claim 1, wherein the aromatic isocyanate compound is at least one selected from among toluene diisocyanate or halogenated toluene diisocyanate.

4. The polarizing plate according to claim 1, wherein a weight ratio of the polyisocyanate curing agent comprising a plurality of units each containing an alkylene group having a urethane bond and at least two carbon atoms to the isocyanurate group-containing polyisocyanate curing agent is in the range of 10:1 to 30:1.

5. The polarizing plate according to claim 1, wherein the polyisocyanate curing agent comprising a plurality of units each containing an alkylene group having a urethane bond and at least two carbon atoms comprises a polyisocyanate curing agent comprising a plurality of units represented by Formula 1:

*—R$^1$—O—(C=O)—NH—R$^2$—NCO,  [Formula 1]

where * is a linking site; and R$^1$ and R$^2$ are the same or different from each other and a bivalent C$_2$ to C$_{20}$ aliphatic hydrocarbon group.

6. The polarizing plate according to claim 5, wherein R$^2$ in Formula 1 is a C$_6$ alkylene group.

7. The polarizing plate according to claim 1, wherein the silane coupling agent comprises an epoxy group-containing silane coupling agent.

8. The polarizing plate according to claim 1, wherein the composition comprises: 100 parts by weight of the (meth) acrylic copolymer; 10 parts by weight to 30 parts by weight of the polyisocyanate curing agent comprising a plurality of units each containing an alkylene group having a urethane bond and at least two carbon atoms; 0.1 parts by weight to 5 parts by weight of the isocyanurate group-containing polyisocyanate curing agent; and 0.1 parts by weight to 10 parts by weight of the silane coupling agent.

9. The polarizing plate according to claim 7, wherein the silane coupling agent further comprises an isocyanurate group-containing silane coupling agent.

10. The polarizing plate according to claim 9, wherein a weight ratio of the epoxy group-containing silane coupling agent to the isocyanurate group-containing silane coupling agent is in the range of 1:0.1 to 1:10.

11. The polarizing plate according to claim 9, wherein the isocyanurate group-containing silane coupling agent comprises a compound represented by Formula 3:

[Formula 3]

where R$^1$, R$^2$ and R$^3$ are each independently a bivalent organic group, and R$^4$, R$^5$ and R$^6$ are each independently an alkoxysilane group.

12. The polarizing plate according to claim 9, wherein the isocyanurate group-containing silane coupling agent is present in an amount of 0.1 parts by weight to 5 parts by weight relative to 100 parts by weight of the (meth)acrylic copolymer.

13. The polarizing plate according to claim 1, wherein the (meth)acrylic copolymer comprises a copolymer of a monomer mixture comprising 50 wt % to 80 wt % of a (meth) acrylic monomer having a glass transition temperature of 70° C. or more in a homopolymer phase.

14. The polarizing plate according to claim 13, wherein the (meth)acrylic monomer having a glass transition temperature of 70° C. or more in a homopolymer phase is at least one selected from among methyl methacrylate or isobornyl acrylate.

15. The polarizing plate according to claim 13, wherein the monomer mixture further comprises a hydroxyl group-containing (meth)acrylic monomer.

16. The polarizing plate according to claim 1, wherein the barrier layer has a modulus of 100 MPa or more at 25° C.

17. The polarizing plate according to claim 1, wherein the polarizing plate has a maximum decolorized length of 1,000 µm or less, as measured on the polarizer after the polarizing plate is left at 85° C. or 60° C. and at 95% relative humidity (RH) for 250 hours.

18. An optical display device comprising the polarizing plate according to claim 1.

* * * * *